(12) United States Patent
Kupferman

(10) Patent No.: US 11,624,644 B2
(45) Date of Patent: Apr. 11, 2023

(54) PET HARNESS WITH INTEGRATED SCALE

(71) Applicant: Scott J. Kupferman, New York, NY (US)

(72) Inventor: Scott J. Kupferman, New York, NY (US)

( * ) Notice: Subject to any disclaimer, the term of this patent is extended or adjusted under 35 U.S.C. 154(b) by 342 days.

(21) Appl. No.: 16/930,674

(22) Filed: Jul. 16, 2020

(65) Prior Publication Data

US 2022/0018704 A1 Jan. 20, 2022

(51) Int. Cl.
| | |
|---|---|
| *G01G 19/14* | (2006.01) |
| *G01G 19/08* | (2006.01) |
| *A01K 27/00* | (2006.01) |
| *G01G 21/23* | (2006.01) |
| *G01G 17/08* | (2006.01) |
| *G01G 19/52* | (2006.01) |

(52) U.S. Cl.
CPC .......... *G01G 19/14* (2013.01); *A01K 27/002* (2013.01); *G01G 17/08* (2013.01); *G01G 21/23* (2013.01); *G01G 19/52* (2013.01)

(58) Field of Classification Search
CPC ...... A01K 27/002; G01G 17/08; G01G 19/14; G01G 21/23; G01G 21/28; G01G 19/52; G01G 19/58
See application file for complete search history.

(56) References Cited

U.S. PATENT DOCUMENTS

| | | | | |
|---|---|---|---|---|
| 4,482,783 A | * | 11/1984 | Laimins | G01G 19/14 177/211 |
| 4,559,906 A | * | 12/1985 | Smith | A01K 29/00 119/728 |
| 6,429,391 B1 | * | 8/2002 | Gruver | G01G 19/14 177/148 |
| 7,550,684 B2 | * | 6/2009 | Kritzler | G01G 19/58 177/148 |
| 8,952,276 B2 | * | 2/2015 | Lin | A45C 13/30 177/148 |
| 11,268,846 B1 | * | 3/2022 | Mayo | G01G 19/58 |
| 2005/0051586 A1 | * | 3/2005 | Siwak | A45C 13/28 177/245 |
| 2008/0276880 A1 | * | 11/2008 | Swisher | A01K 27/002 119/728 |
| 2013/0213319 A1 | * | 8/2013 | Hoffman | A01K 1/0263 119/792 |
| 2018/0192613 A1 | * | 7/2018 | Keith | A01K 1/029 |
| 2020/0085659 A1 | * | 3/2020 | Tari | B66C 15/00 |

* cited by examiner

*Primary Examiner* — Randy W Gibson
(74) *Attorney, Agent, or Firm* — Ulmer & Berne LLP; Alexander J. Johnson

(57) ABSTRACT

The present invention provides an animal harness comprising a harness body and a scale. The scale is secured to the harness body by a securement means. The harness can be utilized by a user to provide a specific amount of assistance to an animal using the harness because the scale will provide the user with the exact amount the animal weighs and how much assistance the user is providing the animal.

10 Claims, 3 Drawing Sheets

PET HARNESS WITH INTEGRATED SCALE

FIELD OF THE INVENTION

The present invention generally relates to an animal mobility aid. Specifically, the present invention relates to a harness device capable of informing the handler of the animal specifically how much they are assisting with the mobility of the animal. More specifically, the present invention relates to a harness equipped with a scale that shows the handler of the animal exactly how much the animal weighs in whole or in part to measure the assistance in weight being lifted off the hind legs and spine of the animal.

BACKGROUND OF THE INVENTION

For many years, it has been known to use harnesses on pet animals, such as dogs and cats, for the purpose of restraining or controlling the animal. Such harnesses include simple neck collars and more elaborate body harnesses which are typically fitted around the animals' chest as well as around the neck, hips, and spine.

As stated above, a wide variety of collars, harnesses and leads are available for the handling of animals, such as dogs and cats, and especially for assisting these animals during walking. Fewer devices are available for assisting in the handling of such animals once the animals have become debilitated due to age, disease, injury, or trauma requiring surgical interventions and find it difficult to stand and walk as a result of the debilitation for at least a period of time. Among the most common infirmities experienced by animals are those which affect the musculoskeletal structure of the animal, and more specifically, the hips, spine, and extremities in the rear portion of the animal which is commonly weakened by age, disease, and injury requiring surgery and rehabilitation.

As dogs and other animals age, so do their limbs, joints, and muscles. It is not uncommon for animals to develop arthritis in their joints, specifically their hips and spine. Activities that were once easy for an animal to participate in become a chore or impossible. One of the most difficult activities for an animal suffering from these conditions is for them to get up after sitting down. Other activities that become harder with age are walking up and down stairs, going for walks, or entering/exiting a vehicle.

Presently, there are only a few solutions that generally address these problems. One of the current solutions at present are ramps that assist pets in getting in and out of vehicles. These ramps only partially assist the animals, for instance a dog, in that the dog must still cover the elevation between the ground and the vehicle to get in. They also are typically designed such that the dog uses them under their own power. It is awkward and somewhat dangerous for owners to attempt in assisting the dog into the vehicle. There are also general animal lifting solutions and devices known by veterinarians and taught to the owners of the animal. These solutions and devices are designed to be used as a temporary lifting aid. Some known solutions and devices include a sling connected to a handgrip, a rolled-up towel placed under the animal, or a rope. These lifting/assisting apparatuses cannot be used by an animal through the duration of a day. They also cannot be used while the animal is in motion. For example, it is not comfortable for the animal to wear the device during a walk and therefore the owner cannot assist the animal during that activity if the need arises.

Hip and spine or full body harnesses are specific support apparatuses that are known and utilized to assist dogs with hind-end disabilities such as those that affect the hips, knees, and spine. These high-end support apparatuses enable dogs to get the exercise needed and enjoyed by the animals when they experience temporary or permanent hind-leg and spine injuries. These hind-end or full-body support apparatuses help the animal's handler reduce the weight on the back legs and hips of the animals than naturally occur on all 4-legged animals due to gravity. However, when most support apparatuses are recommended by a veterinarian, they are also typically accompanied with an instruction to provide gravity assistance to at least the hind-legs of the animal, possibly by lifting weight off of the hind legs of the animal for a period of time that changes as the animal's condition improves or deteriorates. In almost all instances, the handler of the animal is simply guessing at the amount of gravitational assistance they are providing to the animal when the harness is being utilized. Therefore, there is a need in the art for a harness that informs the handler of the animal as to the specific amount weight they are removing from the hind-legs and spine of the animal or the overall animal if used with a full body harness so as to enable the animal to heal more quickly or to experience less pain and suffering while moving.

SUMMARY OF THE INVENTION

In a first embodiment, the present invention provides an animal harness comprising a harness body and a scale wherein the scale is secured to the harness body.

Another embodiment of the present invention provides an animal harness as in any embodiment above, wherein the harness body is selected from the group consisting of a rear harness and a full-body harness.

Another embodiment of the present invention provides an animal harness as in any embodiment above, wherein the scale is a hand-held travel scale.

Another embodiment of the present invention provides an animal harness as in any embodiment above, further comprising a securement means on a bottom of the scale.

Another embodiment of the present invention provides an animal harness as in any embodiment above, wherein the securement means is selected from the group consisting of a hook loop or a carabiner made from metal and/or non-metal materials.

Another embodiment of the present invention provides an animal harness as in any embodiment above, further comprising a scale holder including a scale aperture and a securement means aperture such that the scale is placed within the scale aperture of the scale holder and the securement means goes through the securement means aperture to be in a position outside the scale holder.

Another embodiment of the present invention provides an animal harness as in any embodiment above, further comprising at least one arm strap wherein the at least one arm strap is secured to the harness by the at least one arm strap being wound through at least one pair of strap apertures in said scale holder.

Another embodiment of the present invention provides an animal harness as in any embodiment above, further comprising two arm straps and two pairs of strap apertures in said scale holder.

BRIEF DESCRIPTION OF THE DRAWINGS

For a more complete understanding of the features and advantages of the present invention, reference is now made to the detailed description of the invention along with the accompanying figures in which.

DETAILED DESCRIPTION OF ILLUSTRATIVE EMBODIMENTS

Figure 1:
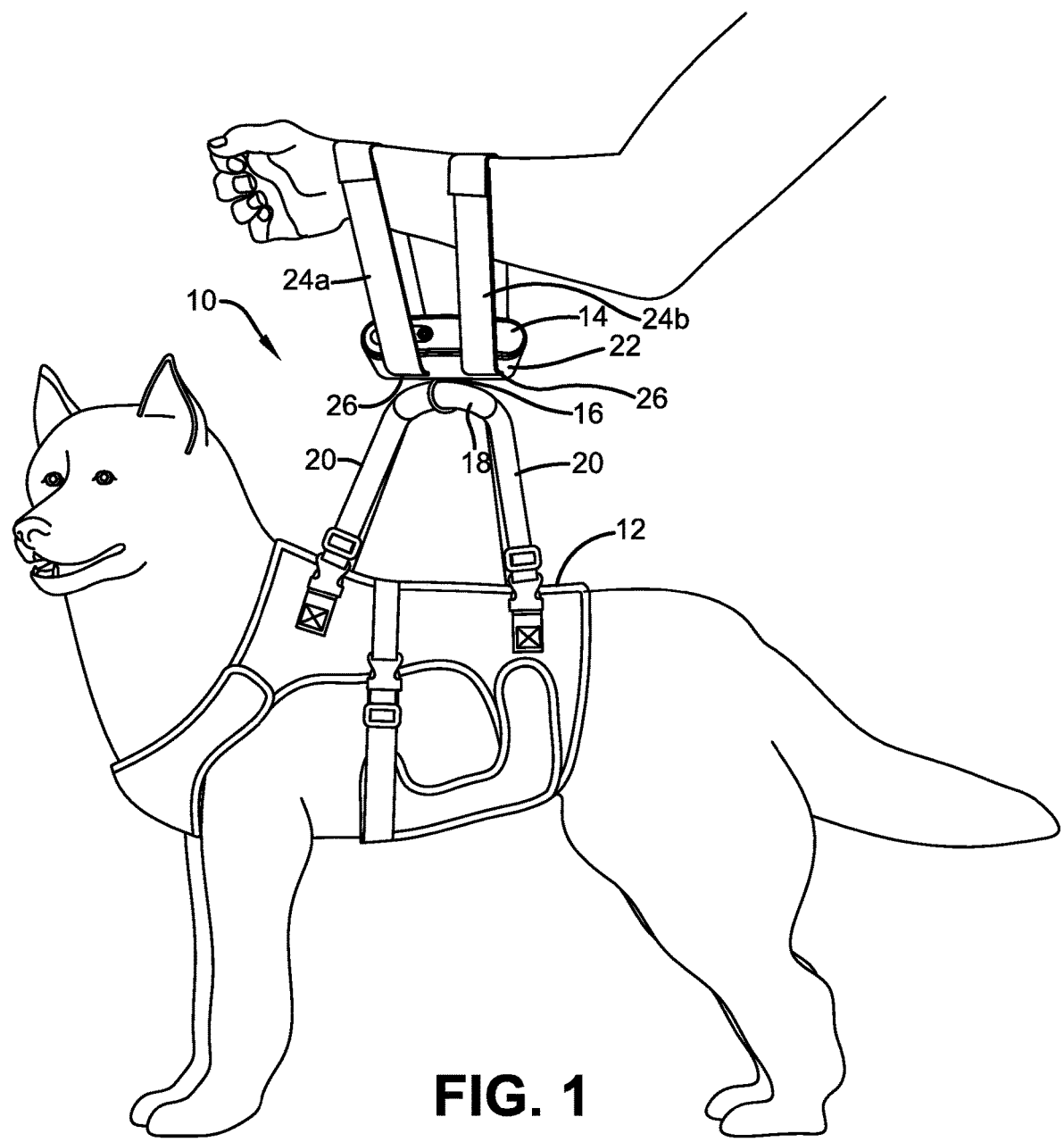
FIG. 1 is a side view of a dog wearing a harness of the present invention wherein the harness body is a full-body type harness body.
Figure 2:
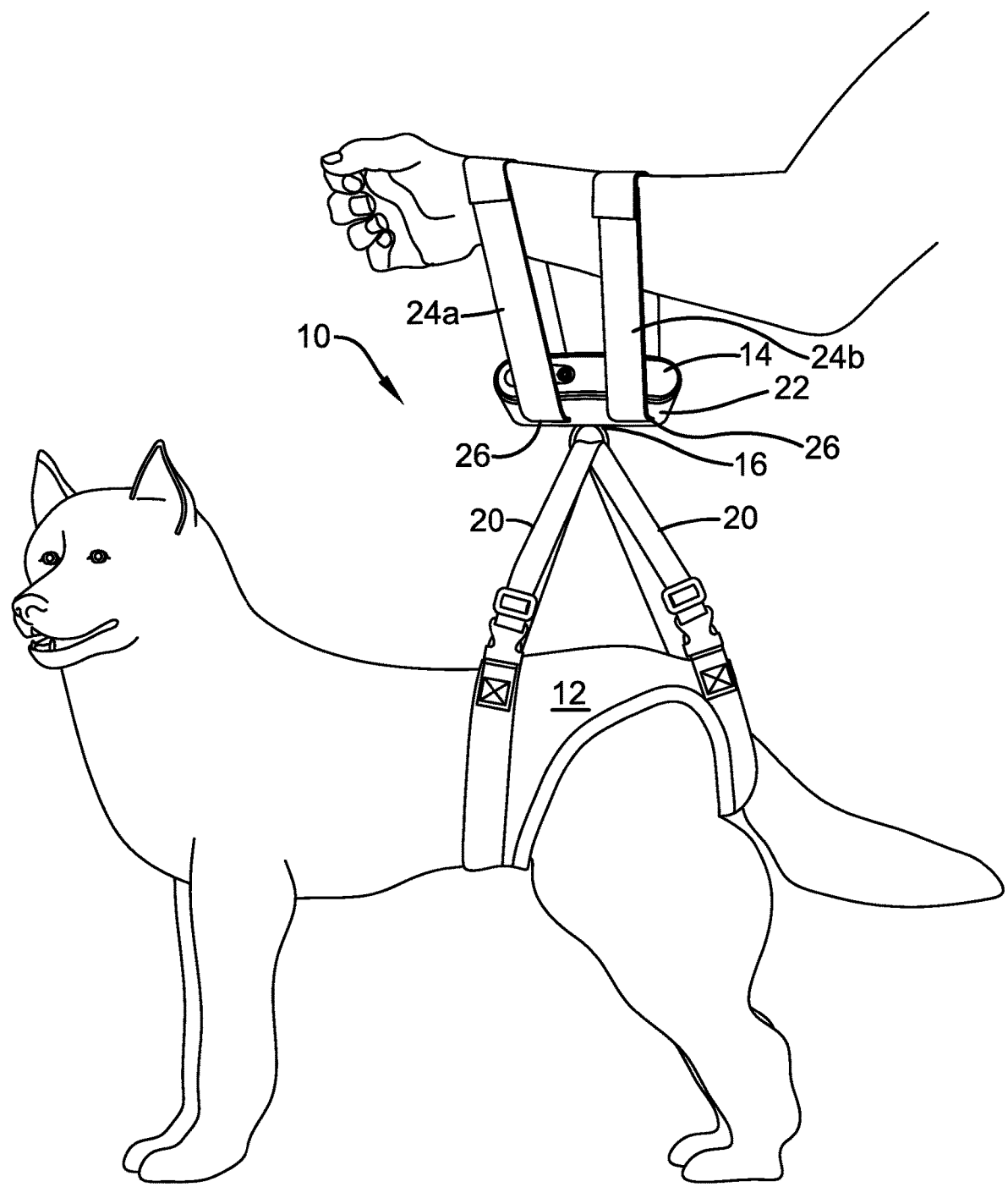
FIG. 2 is a side view of a dog wearing a harness of the present invention wherein the harness body is a rear-harness type harness body.

An animal harness with an integrated scale is generally indicated by the numeral 10. Animal harness 10 includes a harness body 12 and a scale 14. Scale 14 is secured to harness body 12 by an attachment means 16 on the bottom of scale 14. In one or more embodiments of the present invention, attachment means 16 is selected from the group consisting of a hook loop or a carabiner made from metal and/or non-metal materials of varying shapes In one or more embodiments of the present invention, the attachment means 16 will be secured to a handle 18 of the harness body such as shown in FIG. 1 and in yet other embodiments, such as shown in FIG. 2, the attachment means 16 will be secured to harness straps 20 of the harness body. In one or more embodiments of the present invention, harness body 12 is a full body harness that will fit around both the front and rear portions of an animal, such as shown in FIG. 1. In other embodiments, such as shown in FIG. 2, harness body 12 is a rear harness that will only fit around the rear or hind portions of an animal. The present invention is not limited by the type of harness body 12 utilized in the harness 10.

Figure 3:
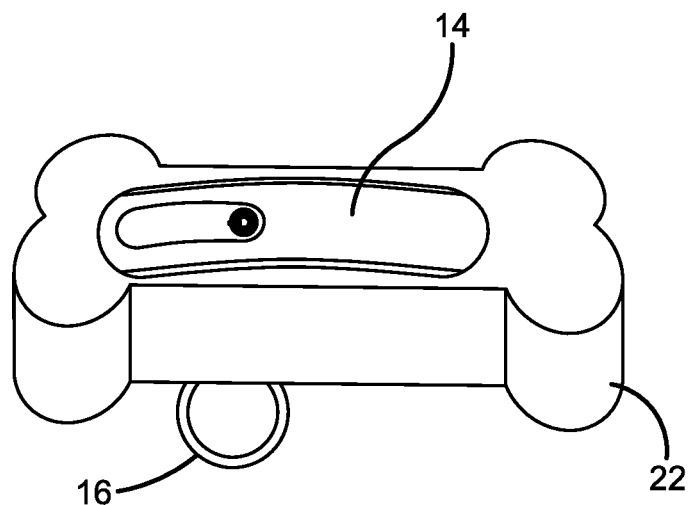
FIG. 3 is a perspective view of the scale of the harness of the present invention placed in a scale holder without a harness body being secured to the scale.
Figure 4:
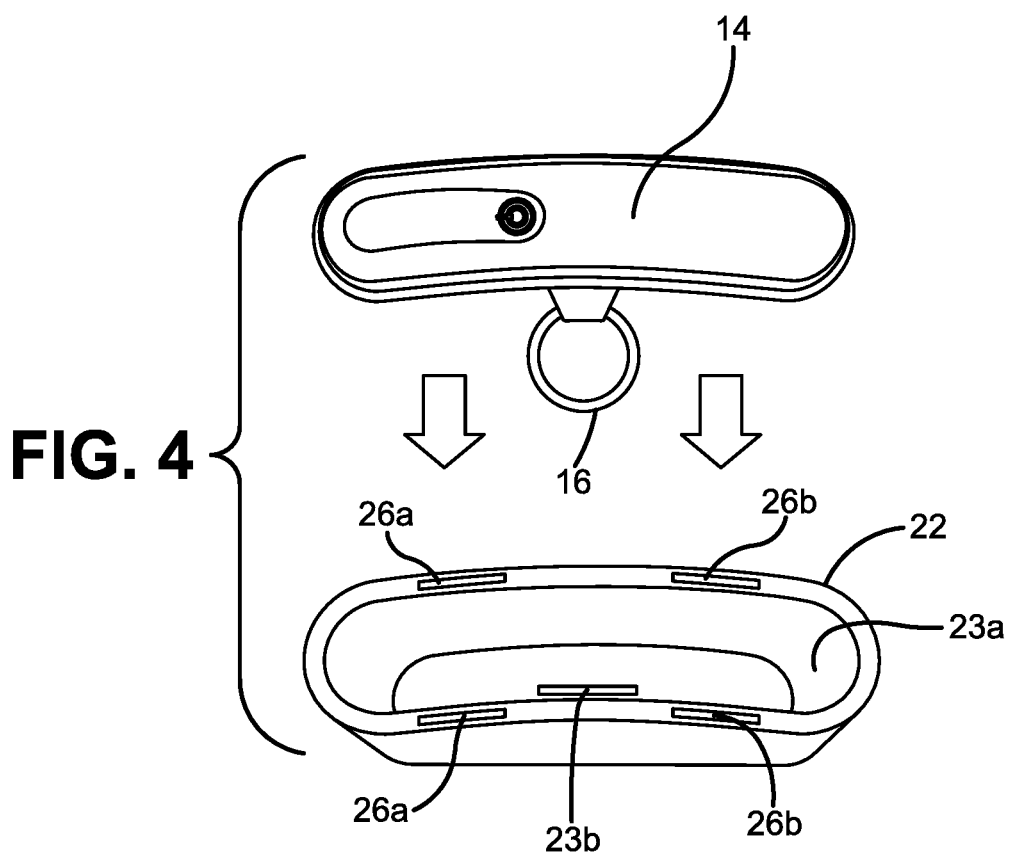
FIG. 4 is perspective view of the scale holder of FIG. 3 prior to a scale being placed within the scale holder.

In one or more embodiments of the present invention, scale 14 is a portable hand-held travel scale with or without a digital readout. Scale 14 can be set in a scale holder 22 for better hand ergonomic support that allows the user of harness 10 to more comfortably hold the harness 10 by gripping scale holder 22 that surrounds scale 14. In some embodiments, scale holder 22 is made from either a plastic material or a foam material, or a combination of both a plastic material and a foam material. FIG. 3 shows scale holder 22 as being made from foam and in the shape of a bone. A scale 14 set in a scale holder 22 is shown in FIG. 3 without a harness body 12 being secured to scale 14. Scale holder 22 includes a scale aperture 23a and an attachment means aperture 23b located in a position opposite the scale aperture 23a as shown in FIG. 4. Scale 14 is placed within the scale aperture 23a and then the attachment means 16 on the bottom of scale 14 will be placed through the attachment means aperture 23b such that the attachment means 16 is in a position outside the scale holder 22.

In one or more embodiments of the present invention, harness 10 also includes at least one arm strap 24 to allow the user of harness 10 to carry harness 10 by placing their arm in the at least one arm strap 24, such as shown in both FIGS. 1 and 2. In one or more embodiments of the present invention, harness 10 includes two arm straps 24a and 24b such as shown in FIGS. 1 and 2. If present, the at least one arm strap 24 is secured to harness 10 by being wound through a pair of arm strap apertures 26a and 26b positioned near a top of holder 22 as shown in FIG. 4, or at a position closer to a bottom of holder 22 as shown in FIGS. 1 and 2.

In practice, once the at least one arm strap 24 is wound through the pair of arm strap apertures 26a and/or 26b, the ends of the at least one strap 24 will connect together through the use of a hook and loop connection means located at the ends of the at least one arm strap 24.

To use harness 10, a user would secure harness body 12 to an animal in a conventional manner. Once harness body 12 is secured to the animal, the user can then grasp the scale 14 and scale holder 22 directly. The user can then lift-up on the scale 14 and scale holder 22 and in doing so, the user will lift the animal in the harness body 12. If the user desires to use the at least one arm strap 24 then the user will secure the at least one arm strap through an aperture 26 in scale holder 22, secure the ends of the at least one arm strap 24 together, then slide their arm through the at least arm strap 24 (as shown in FIGS. 1 and 2), then the user can lift up on the at least one arm strap 24, and in doing so, the user will lift the animal in the harness body 12 The user can see exactly how much weight they are lifting off of the animal in harness 10 by reading the scale 14. Therefore, harness 10 can be utilized as an animal scale and/or to know exactly how much weight they are lifting off an animal, and in that manner the user will be able to provide a specific amount of assistance to the animal.

In light of the foregoing, it should be appreciated that the present invention significantly advances the art by providing a pet harness with an integrated scale that is structurally and functionally improved in a number of ways. While particular embodiments of the invention have been disclosed in detail herein, it should be appreciated that the invention is not limited thereto or thereby inasmuch as variations on the invention herein will be readily appreciated by those of ordinary skill in the art. The scope of the invention shall be appreciated from the claims that follow.

What is claimed is:

1. An animal harness comprising a harness body, a scale, and a scale holder, wherein the scale is secured to the harness body, wherein the scale has a securement means on a bottom of the scale, wherein the scale holder includes a scale aperture and a securement means aperture such that the scale is placeable within the scale aperture of the scale holder and the securement means goes through the securement means aperture to be in a position outside the scale holder.

2. The animal harness of claim 1, wherein the harness body is selected from the group consisting of a rear harness and a full-body harness.

3. The animal harness of claim 1, wherein the scale is a hand-held travel scale.

4. The animal harness of claim 1, wherein the securement means is selected from the group consisting of a hook loop or a carabiner made from metal and/or non-metal materials.

5. An animal harness comprising a harness body, a scale, a scale holder, and at least one arm strap, wherein the scale is secured to the harness body and wherein the at least one arm strap is secured to the harness by the at least one arm strap being wound through at least one pair of strap apertures in said scale holder.

6. The animal harness of claim 5, further comprising two arm straps and two pairs of strap apertures in said scale holder.

7. The animal harness of claim 5, wherein the harness body is selected from the group consisting of a rear harness and a full-body harness.

8. The animal harness of claim 5, wherein the scale is a hand-held travel scale.

9. The animal harness of claim 5, wherein the scale has a securement means on a bottom of the scale, wherein the scale holder includes a scale aperture and a securement means aperture such that the scale is placeable within the scale aperture of the scale holder and the securement means goes through the securement means aperture to be in a position outside the scale holder.

10. The animal harness of claim 9, wherein the securement means is selected from the group consisting of a hook loop or a carabiner made from metal and/or non-metal materials.

\* \* \* \* \*